US009821959B2

(12) United States Patent
Hognaland

(10) Patent No.: US 9,821,959 B2
(45) Date of Patent: Nov. 21, 2017

(54) ROBOT FOR TRANSPORTING STORAGE BINS

(71) Applicant: JAKOB HATTELAND LOGISTICS AS, Nedre Vats (NO)

(72) Inventor: Ingvar Hognaland, Nedre Vats (NO)

(73) Assignee: Autostore Technology AS, Vindafjord (NO)

( * ) Notice: Subject to any disclaimer, the term of this patent is extended or adjusted under 35 U.S.C. 154(b) by 0 days.

(21) Appl. No.: 15/110,245

(22) PCT Filed: Jan. 6, 2015

(86) PCT No.: PCT/EP2015/050103
§ 371 (c)(1),
(2) Date: Jul. 7, 2016

(87) PCT Pub. No.: WO2015/104263
PCT Pub. Date: Jul. 16, 2015

(65) Prior Publication Data
US 2016/0325932 A1 Nov. 10, 2016

(30) Foreign Application Priority Data
Jan. 8, 2014 (NO) .................................. 20140015

(51) Int. Cl.
*G06F 7/00* (2006.01)
*B65G 1/04* (2006.01)
(Continued)

(52) U.S. Cl.
CPC ........ *B65G 1/0464* (2013.01); *B60L 11/1809* (2013.01); *B60L 11/1816* (2013.01);
(Continued)

(58) Field of Classification Search
USPC ........................................................ 700/218
See application file for complete search history.

(56) References Cited

U.S. PATENT DOCUMENTS 7,381,022 B1 6/2008 King
2003/0229416 A1 12/2003 Tai et al.
(Continued)

FOREIGN PATENT DOCUMENTS

EP 2 308 778 A2 4/2011
EP 2 450 296 A1 5/2012
(Continued)

OTHER PUBLICATIONS

International Search Report issued in PCT/EP2015/050103 dated Aug. 18, 2015 (7 pages).
(Continued)

*Primary Examiner* — Kyle Logan
(74) *Attorney, Agent, or Firm* — Osha Liang LLP

(57) ABSTRACT

A remotely operated vehicle assembly for picking up storage bins from a storage system includes a vehicle body that displays a cavity for receiving a storage bin situated somewhere within the storage system, a vehicle lifting device at least indirectly connected to the vehicle body for lifting the storage bin into the cavity, driving mechanisms or components connected to the vehicle body allowing remotely controlled movements of the vehicle assembly within the storage system, a wireless communication link that provides wireless communication between the vehicle assembly and a remote control unit such as a computer, one or more main power sources supplying electrical power to the driving mechanisms or components and vehicle coupling means for operational and releasable coupling of the main power source to the vehicle body.

16 Claims, 9 Drawing Sheets

(51) Int. Cl.
*B60L 11/18* (2006.01)
*B65G 1/06* (2006.01)
*B60L 15/40* (2006.01)
*H02J 7/00* (2006.01)
*H02J 13/00* (2006.01)

(52) U.S. Cl.
CPC ........... *B60L 11/1879* (2013.01); *B60L 15/40* (2013.01); *B65G 1/0478* (2013.01); *B65G 1/065* (2013.01); *H02J 7/0027* (2013.01); *H02J 13/0003* (2013.01); *Y02T 90/16* (2013.01)

(56) References Cited

U.S. PATENT DOCUMENTS

| | | | |
|---|---|---|---|
| 2007/0012496 A1 | 1/2007 | Chene et al. | |
| 2010/0071979 A1* | 3/2010 | Heichal | B60K 1/04 180/68.5 |
| 2010/0292877 A1* | 11/2010 | Lee | B60K 1/04 701/21 |
| 2011/0106294 A1* | 5/2011 | Bebbington | B60L 11/1822 700/215 |
| 2012/0207580 A1 | 8/2012 | Nave et al. | |
| 2013/0041546 A1* | 2/2013 | Barwick | B60K 17/30 701/23 |
| 2013/0282472 A1 | 10/2013 | Penilla et al. | |
| 2014/0002019 A1 | 1/2014 | Park et al. | |
| 2014/0217975 A1* | 8/2014 | Hayashi | B60M 7/003 320/109 |
| 2015/0127143 A1* | 5/2015 | Lindbo | B65G 1/0464 700/218 |

FOREIGN PATENT DOCUMENTS

| | | |
|---|---|---|
| EP | 2 546 173 A1 | 1/2013 |
| FR | 2 982 223 A1 | 5/2013 |
| JP | S49-127377 A | 12/1974 |
| NO | 317366 B1 | 10/2004 |
| NO | 20121488 A1 | 6/2014 |
| WO | 98/49075 A1 | 11/1998 |
| WO | 2013/167907 A1 | 11/2013 |

OTHER PUBLICATIONS

Written Opinion of the International Searching Authority issued in PCT/EP2015/050103 dated Aug. 18, 2015 (9 pages).
International Preliminary Report on Patentability from PCT/EP2015/050103 dated Apr. 26, 2016 (17 pages).
Norwegian Search Report issued in NO 20140015 dated Aug. 7, 2014 (2 pages).

* cited by examiner

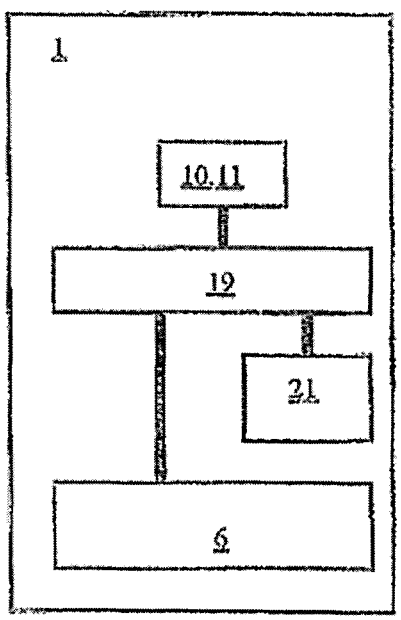 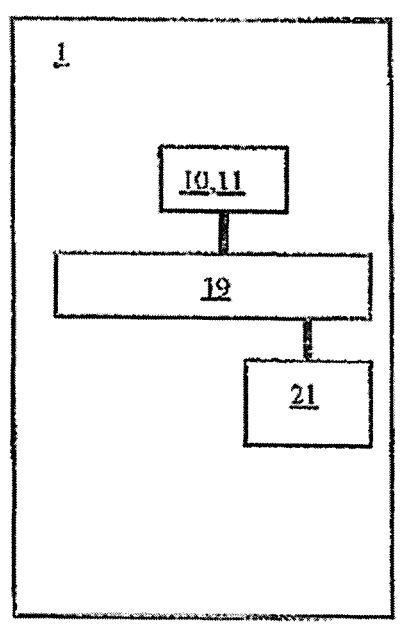
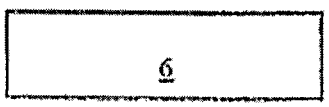
FIG. 6(a)　　　　　　　FIG. 6(b)

ROBOT FOR TRANSPORTING STORAGE BINS

TECHNICAL FIELD

The present invention relates to a remotely operated vehicle for picking up storage bins from a storage system as defined in the preamble of claim 1, a storage system for storage of bins and a method for changing a power source.

BACKGROUND AND PRIOR ART

A remotely operated vehicle for picking up storage bins from a storage system is known. A detailed description of a relevant prior art storage system is presented in WO 98/49075, and details of a prior art vehicle being suitable for such a storage system is disclosed in Norwegian patent NO317366. Such a prior art storage system comprises a three dimensional storage grid containing storage bins that are stacked on top of each other up to a certain height. The storage grid is normally constructed as aluminium columns interconnected by top rails, and a number of remotely operated vehicles, or robots, are arranged to move laterally on these rails. Each robot is equipped with a lift for picking up, carrying, and placing bins that are stored in the storage grid, and a rechargeable battery in order to supply electrical effect to a robot incorporated motor. The robot typically communicates with a control system via a wireless link and is recharged at a charging station when needed, typically at night.

An example of a prior art storage system art is illustrated in FIG. 1. The storage system 3 includes a plurality of robots 1 configured to move on dedicated supporting rails 13 and to receive a storage bin 2 from a storage column 8 within a bin storing grid 15. The prior art storage system 3 may also include a dedicated bin lift device 50, the latter being arranged to receive a storage bin 2 from the robot 1 at the top level of the storage system 3 and to convey the storage bin 2 down in a vertical direction to a delivery station, or port 60.

However, with this known system there is an undesired robot standstill due to the need of recharge, thereby reducing the operational cycle of the storage system 3 as a whole to typically 16 hours per day.

It is thus an object of the present invention to provide a solution that enables a significant increase in the overall operational cycle, preferably close to 24 hours per day.

SUMMARY OF THE INVENTION

The present invention is set forth and characterized in the main claims, while the dependent claims describe other characteristics of the invention.

In particular, the invention concerns a remotely operated vehicle assembly for picking up storage bins from a storage system, comprising a vehicle body which displays a cavity for receiving a storage bin situated somewhere within the storage system, a vehicle lifting device at least indirectly connected to the vehicle body for lifting the storage bin into the cavity, driving means connected to the vehicle body allowing remotely controlled movements of the vehicle assembly within the storage system, wireless communication means for providing wireless communication between the vehicle assembly and a remote control unit such as a computer, one or more main power sources supplying electrical power to the driving means and vehicle coupling means for operational and releasable coupling of the main power source to the vehicle body. Operational coupling is defined as a coupling that ensures power flow between the power source and the driving means.

In a preferred embodiment the coupling means is configured to allow automatic interchange/transfer of the main power source to a charging station after receiving at least one communication signal from the control unit, i.e. a transfer performed without any needs of human intervention.

In another preferred embodiment the vehicle assembly further comprises one or more auxiliary power sources for supplying electrical power to the driving means. This or these auxiliary power source(s) may be operated in addition to, or in absence of, one, several, or all of the main power sources.

In another preferred embodiment the vehicle assembly further comprises a management system for managing at least one of the power sources. Such a management system comprises means for monitoring at least one of voltage, temperature, state of charge, depth of discharge, state of health, coolant flow and current, and/or recharging controlling means for controlling at least one parameter related to recharging of at least one of the power sources such as one or more of the above mentioned monitoring parameters.

In another preferred embodiment the minimum amount of power stored in the auxiliary power source(s) equals the power required to move the vehicle assembly from one charging station to an adjacent charging station during operation.

In another preferred embodiment the one or more auxiliary power sources and the one or more main power sources are interconnected such that the main power source(s) may charge the auxiliary power source(s) while the main power source(s) provides electrical power to the vehicle.

In another preferred embodiment at least one of the power sources, i.e. at least one of the main power sources and/or at least one of the auxiliary power sources, is a capacitor, for example a supercapacitor such as a double-layer capacitor, a pseudocapacitor and/or a hybrid capacitor.

In another preferred embodiment the at least one of the power sources, i.e. at least one of the main power sources and/or at least one of the auxiliary power sources, is a rechargeable battery. Examples of rechargeable batteries are Lithium-Ion battery, Nickel-Cadmium battery, Nickel-Metal Hydride battery, Lithium-Ion Polymer battery, Lithium Sulfur battery, Thin Film battery, Smart battery Carbon Foam-based Lead Acid battery, Potassium-Ion battery, Sodium-Ion battery or a combination thereof. In order to monitor and control the performance of the at least one battery the vehicle assembly may further comprise a battery management system (BMS) in the form of a printed circuit board managing/controlling for example the charge to at least one of the power sources. This BMS is advantageously operatively arranged at or within the main power source.

In another preferred embodiment the main power source comprises a receiving means enabling releasable connection to a corresponding charge station connection means situated on a charge station, where at least one of the receiving means may advantageously be a hook receiving means such as a recess, an aperture or a hank, allowing releasable connection with a corresponding pivotable charge station hook situated on a charge station.

In another preferred embodiment the vehicle connection means further comprises at least one battery hook pivotable connected to the vehicle body, enabling releasable connection between the main power source(s) and the vehicle body.

The invention also concerns a storage system for storage of bins, for example a storage system having a structure similar to the structure disclosed in detail in Norwegian patent application NO20121488. The system comprises
- one or more remotely operated vehicles in accordance with the above disclosed vehicle,
- one or more charging stations,
- a vehicle support comprising a plurality of supporting rails and
- a bin storing structure supporting the vehicle support, and containing a plurality of storage columns, wherein each storage columns is arranged to accommodate a vertical stack of storage bins. The main part of the bin storing structure coincides with positions on the vehicle support in which the supporting rails are crossing.

The invention furthermore concerns a method for charging a power source arranged in, near or on a remotely operated vehicle. Such a method comprises the following steps:
a) moving the remotely operated vehicle assembly to a charging position adjacent to a first charging station,
b) transferring a first main power source connected to a vehicle body of the vehicle assembly to the first charging station,
c) moving the vehicle assembly to a second charging station using an auxiliary power source supplying auxiliary electrical power to driving means and
d) transferring a second main power source connected to the second charging station to the vehicle body, the second main power source having been charged for a time period by the second charging station.

The charging stations are preferably arranged on an underlying support onto which the vehicle assembly is moving.

In a preferred embodiment the method further comprises the steps:
lowering the vehicle body towards the underlying vehicle support step b) and during step d), thereby disconnecting the main power source from the vehicle body and
raising the vehicle body away from the underlying vehicle support step b) and after step d), thereby allowing connection of the main power source (6) to the charging station.

The lowering and raising of the vehicle body is achieved by elongation means connected to, or being an integral part of, the driving means.

In another preferred embodiment the method steps are controlled by transmitting communication signals between a control unit and a wireless communication means within the vehicle.

The vehicle assembly used in the method may advantageously be of the type as disclosed above.

In the following description, numerous specific details are introduced to provide a thorough understanding of embodiments of the claimed vehicle, system and method. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

BRIEF DESCRIPTION OF THE DRAWINGS

FIG. 6 is a block diagram of a robot showing a main power source and an auxiliary power source, wherein FIGS. 6 (a) and (b) shows the main power source being operationally connected to, and disconnected from, the robot, respectively.

DETAILED DESCRIPTION OF THE INVENTION

Figure 1:
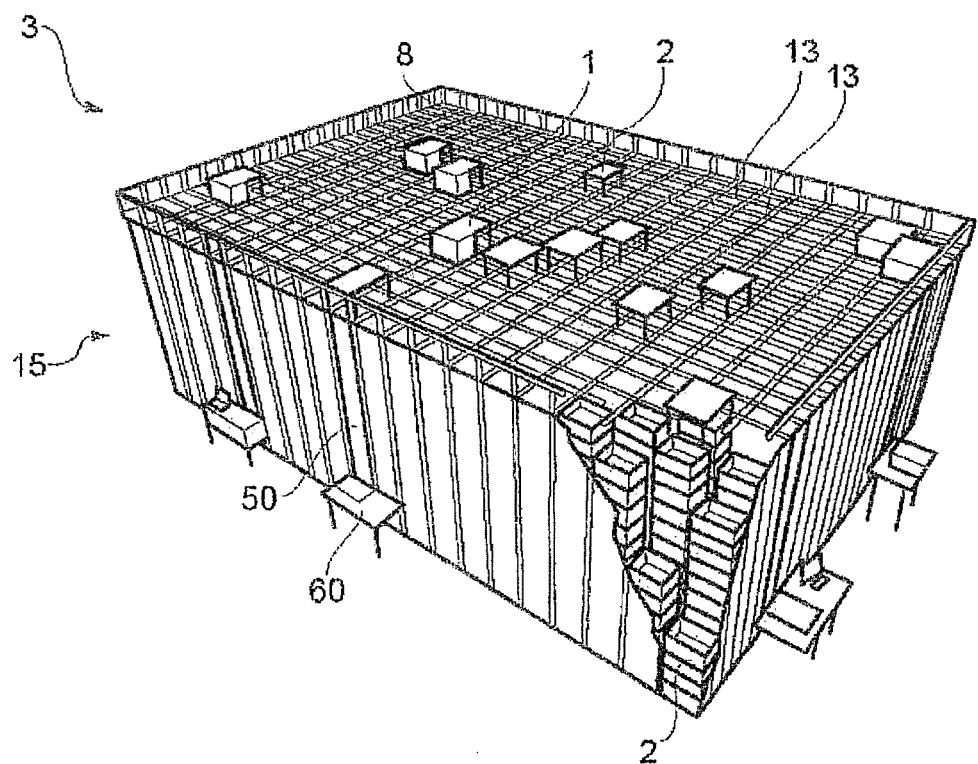
FIG. 1 is a perspective view of a prior art storage system.
Figure 2:
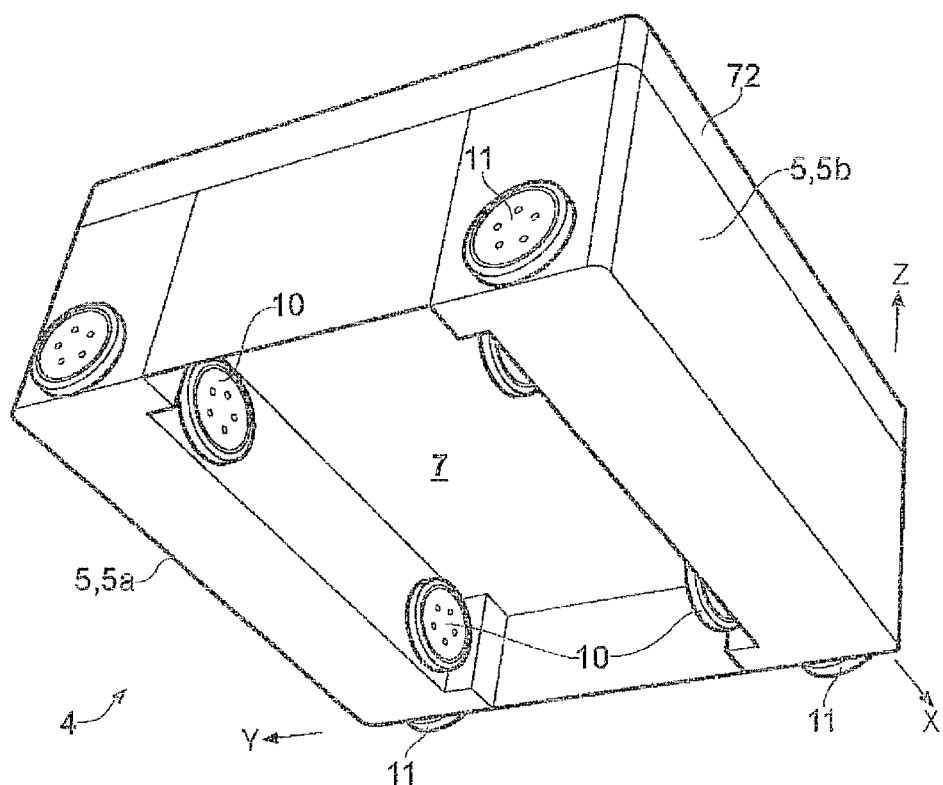
FIG. 2 is a perspective base view of a remotely operated vehicle according to the invention.
Figure 3:
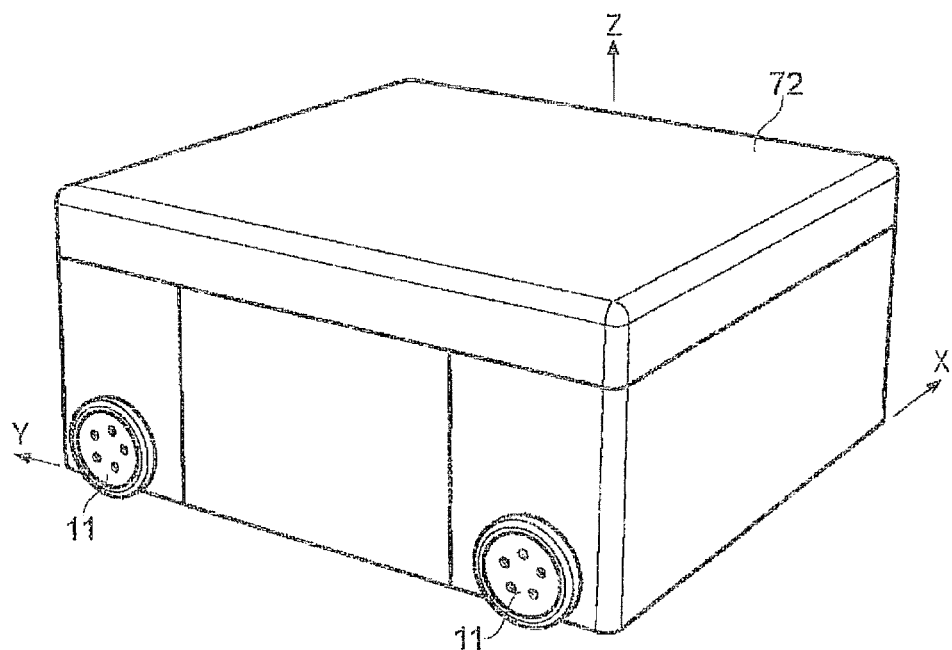
FIG. 3 is a perspective top view of a remotely operated vehicle according to the invention.

FIGS. 2 and 3 give perspective views in two different angles of a robot 1 comprising a rectangular vehicle body or framework 4 displaying a cavity 7 centrally arranged therewithin, a top lid 72 covering the top part of the body 4, a first set of four wheels 10 mounted inside the cavity 7 and a second set of four wheels 11 mounted at the exterior walls of the body 4. The first and second set of wheels 10, 11 are oriented perpendicular to each other. For the sake of clarity a Cartesian coordinate system is shown with its X, Y and Z axes aligned along the principal directions of the rectangular vehicle body 4. The size of the cavity 7 is adapted to contain necessary component for a lifting device 9 (see FIG. 4) and to contain the largest storage bin 2 intended to be picked up by the robot 1.

Figure 4:
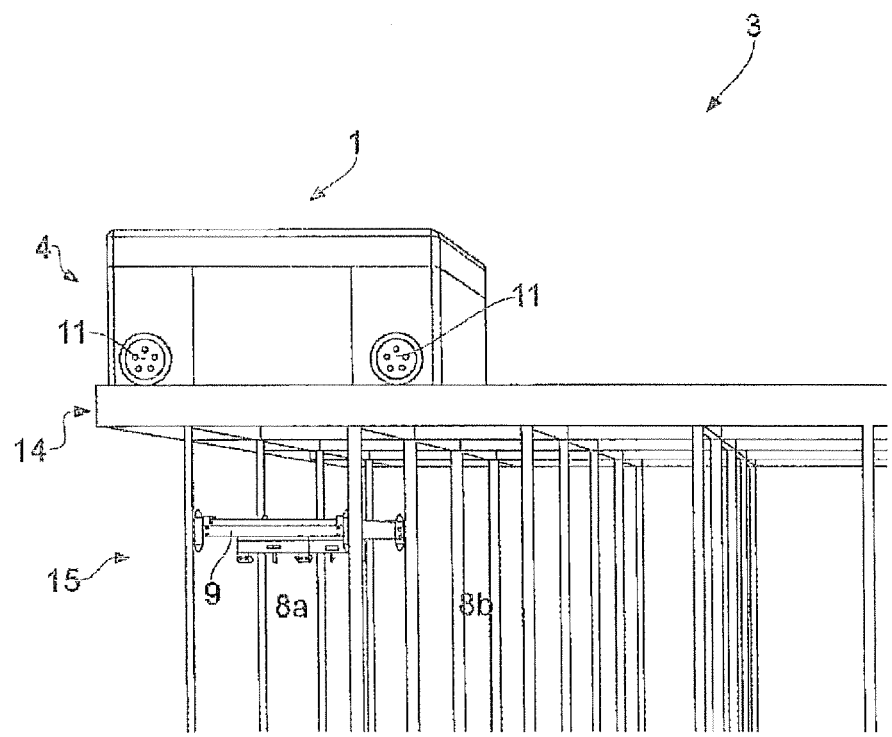
FIG. 4 is a perspective side view of part of a storage system in accordance with the invention including a bin storing grid, a vehicle support and a robot.

FIG. 4 shows a part of a storage system 2 where the robot 1 is in a lifting position on a vehicle support 14, directly above a storage column 8 within a supporting bin storing structure 15. A vehicle lifting device 9 is lowered a distance into the storage column 8 in order to hook onto and lift up any storage bin 2 within the column 8.

All operations of the robot 1 are controlled by wireless communication means 19 and remote control units. This includes control of the robot movement, the vehicle lifting device 9 and any vehicle position measurements.

Figure 5:
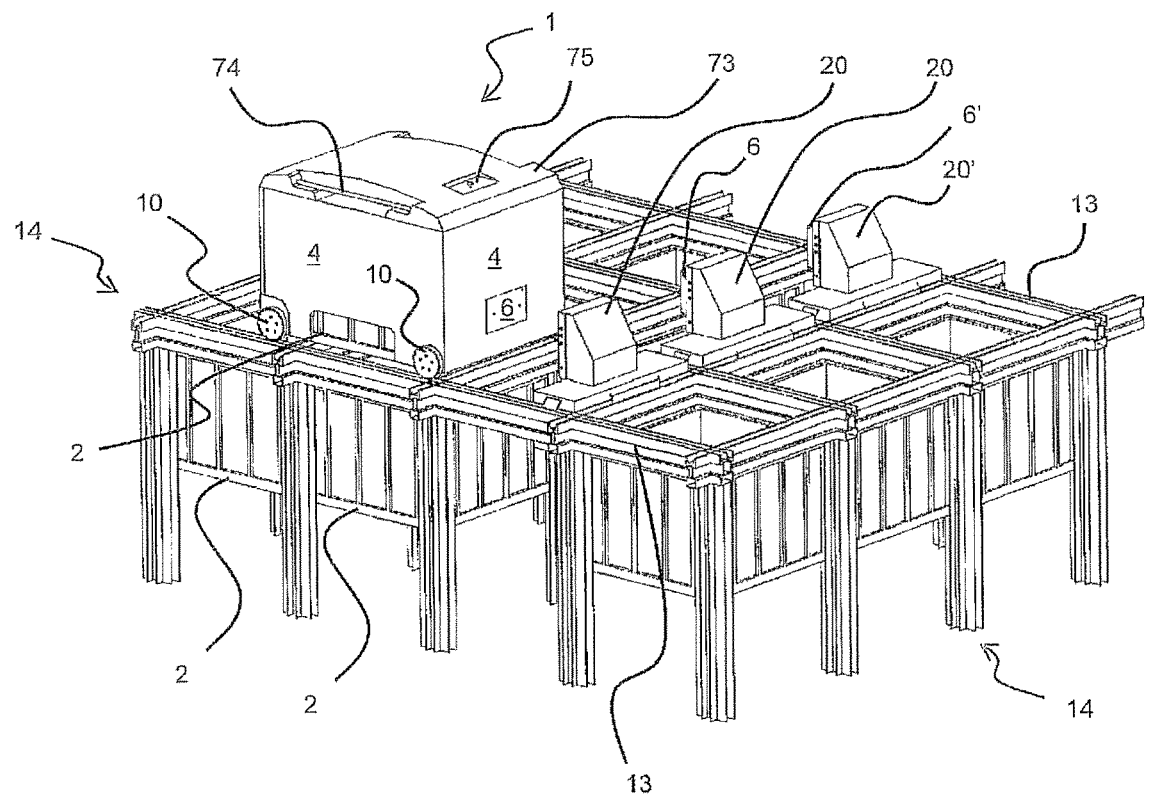
FIG. 5 is a perspective side view of part of a storage system in accordance with the invention including a bin storing grid, a vehicle support, a robot and a plurality of charging stations.

As in FIG. 4 the robot 1 is in FIG. 5 shown arranged on a vehicle support 14 composed of a plurality of supporting rails 13, which vehicle support 14 is supported on a bin storing structure 15 constituting a plurality of storage columns 8.

The robot 1 of FIG. 5 comprises a main battery 6, battery holding means 22-24 for holding a main battery 6 during operation, as well as enabling flow of necessary power to the robots 1 driving means 10,11, an enclosing cover 73 with handles 74 and a control panel 75. In order to allow charging of the main battery 6 the inventive storage system 3 further comprises several charging stations 20,20' being fixed to the vehicle support 14 in positions that are accessible for the part of the vehicle body 4 including the main battery 6 and/or the robot connection means 22-24. Each charging station 20, 20' comprises corresponding station connection means 25,26 which aids in the transfer of the main battery 6, as well as ensure stable connection and electrical charging. FIG. 5 shows the particular situation where the robot 1 is approaching the charging station 20 in order to transfer an almost discharged main battery 6 to a battery vacant charging station 20. After a successful transfer, the robot 1 is moved to another charging station 20', typically being the closest charging station 20' that contains a main battery 6 being charged to a fully operational level. Such a movement from a first charging station 20 to a second charging station 20' along the vehicle support 14 may be ensured by means of an auxiliary power source or battery 21 as schematically indicated in the block diagram of FIG. 6, where FIGS. 6 (a) and 6 (b) shows the robot 1 having the main battery connected and disconnected, respectively. When connected, the terminals of the main battery 6 are electrically connected to circuit board 19, which again is controlling the power flow to the driving means 10,11. Note that driving means 10,11 includes all mechanisms and/or components within the robot 1 that at least ensures lateral movements, including wheels, motor, gears, etc. Furthermore, both FIGS. 6 (a) and 6 (b) indicates the above mentioned auxiliary battery 21, which terminals are electrically connected to the same circuit board 19 as the main battery 6. As a result the robot 1 may with this configuration provide sufficient power to the driving means 10,11 to allow operation (lateral movements, elevations, operation of lifting device 9) of the robot 1 even in the complete (physical and/or electrical) absence of the main battery 6 (FIG. 6 (b)). When the main battery 6 is connected, the auxiliary battery 21 may either remain electrically disconnected or function as an additional power source during the continuous operation of the robot 1.

Figure 7:
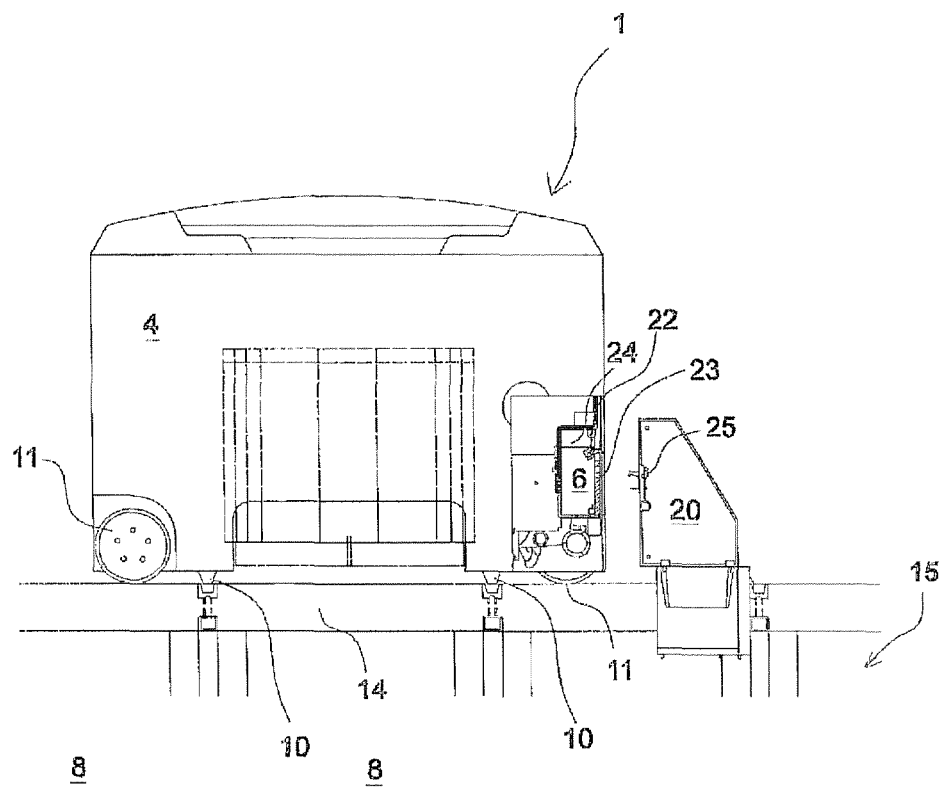
FIG. 7 is a cross sectional view of a robot and a charging station,
FIGS. 8 (a)-(d) are cross sectional views of a robot and a charging station, wherein FIG. 8 (a) shows a battery containing robot in a raised position and at a distance from its charging position, FIGS. 8 (b) and 8 (c) show a battery containing robot in a raised position and a lowered position, respectively, situated adjacent to its charging position and FIG. 8 (d) shows the robot in a lowered position at a distance from its charging position after transfer of the battery to the charging station and,
FIGS. 9 (a)-(c) are cross sectional cut-outs providing further details of the connection mechanisms in FIGS. 8 (b)-(d), wherein FIGS. 9 (a) and (b) show connecting hooks on the robot and the charging stations in raised and lowered position, respectively, and FIG. 9 (c) shows the connecting hooks after successful connection of the battery to the charging station.
Figure 8A:
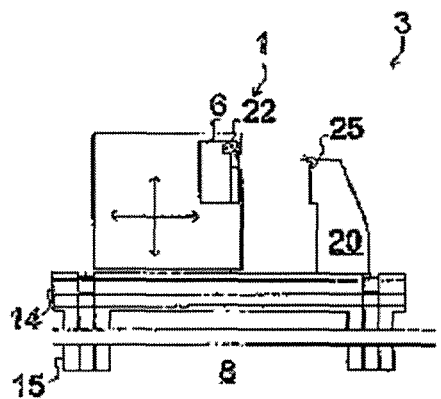
Figure 8B:
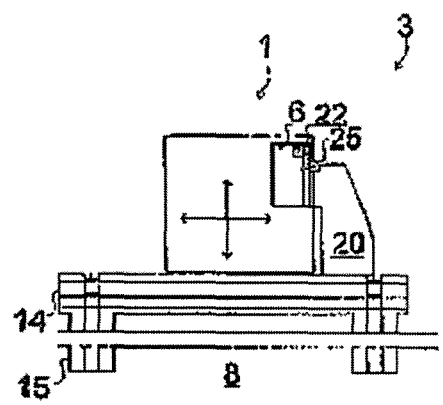
Figure 8C:
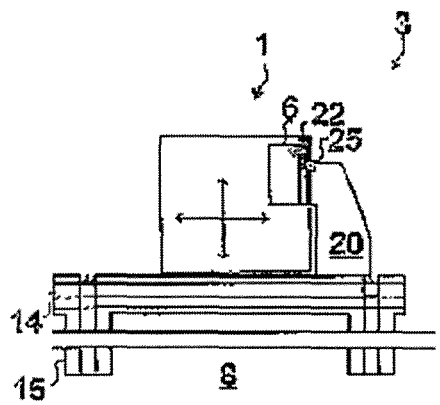
Figure 8D:
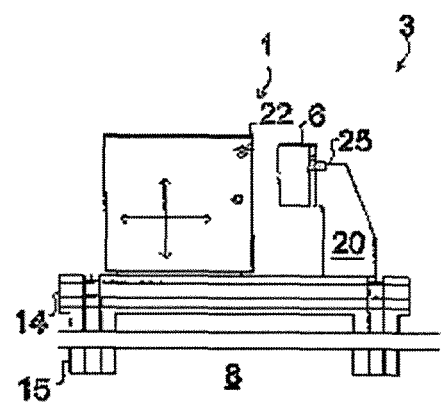

FIG. 7 is a cross sectional view of a robot 1 and a charging station 20 arranged on top of the vehicle support 14, showing in further details the location of the main battery 6, in this embodiment arranged within a dedicated main battery cavity 24, and the components constituting the robot holding means 22,23 on the side of the robot 1 and the station holding means 25,26 on the side of the charging station 20. The robot connection means 22,23 are illustrated as at least one robot hook 22 pivotably fixed to the side walls of the main battery cavity 24, thereby fixing the main battery 6 in position, and at least one robot aperture 23 present at the side of the main battery 6 facing the charging station 20,20'. Likewise, the side of the charging station 20,20' facing the robot 1 comprises at least one pivotable charge station hook 25 that may be releasably fastened to the robot aperture(s) 23 and at least one charge station aperture 26 that may be releasably receiving the pivotable robot hook(s) 22. The robot 1 is in the lateral position shown in FIG. 7 adjustable in vertical direction, i.e. perpendicular to the vehicle support 14, to ensure reliable and easy fastening of the robot and charge station hooks 22,25 into their respective robot and charge station apertures 23,26. This movement is further detailed in FIG. 8 which illustrates four different stages (a)-(d) of the main battery transfer process from the robot 1 to the charging station 20,20'. In the first stage (FIG. 8 (a)) the robot 1 containing the main battery 6 is approaching the charging station 20,20' in an elevated position. When the robot 1 is in the lateral transfer position relative to the charging station 20,20' (FIG. 8 (b)) the charge station situated charge station hooks 25 are being guided into their corresponding main battery situated robot apertures 23. The robot 1 is subsequently lowered a predetermined distance towards the underlying vehicle support 14 (FIG. 8 (c)), resulting in a release of the robot hooks 22 from the main battery 6. Finally the robot 1 is retracted away from the charging station 20,20' using the auxiliary power source 22 while remaining in the lowered position (FIG. 8 (d)). The robot 1 may then regain the elevated position and move along the vehicle support 14 to a charging station 20' with a sufficiently charged main battery 6.

Figure 9:
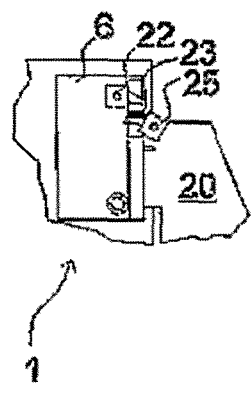
Figure 9:
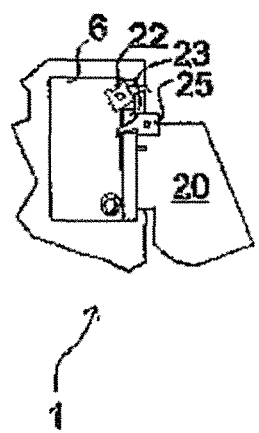
Figure 9:
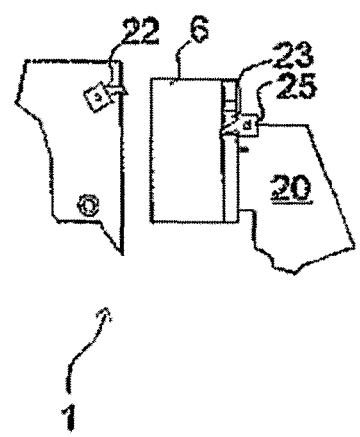

FIG. 9 (a)-(c) presents an even more detailed presentation of the main battery transfer process from the robot 1 to the charging station 20. FIG. 9 (a) corresponds to the situation depicted in FIG. 8 (b), that is, when the elevated robot 1 has been moved to a transfer position relative to the charging station 20 and the charge station hook 25 has been successfully guided and hooked to the corresponding robot aperture 23. Further, FIG. 9 (b) corresponds to the situation depicted in FIG. 8 (c), when the robot 1 has been lowered, thereby releasing the robot hook 22 from the main battery 6. And finally, FIG. 9 (c) corresponds to the situation depicted in FIG. 8 (d), when the robot 1 has been retracted from the charging station 20 by means of the auxiliary power source 21, leaving the main battery in a charging connection to the charging station 20.

In the preceding description, various aspects of the apparatus according to the invention have been described with reference to the illustrative embodiment. For purposes of explanation, specific numbers, systems and configurations were set forth in order to provide a thorough understanding of the apparatus and its workings. However, this description is not intended to be construed in a limiting sense. Various modifications and variations of the illustrative embodiment, as well as other embodiments of the apparatus, which are apparent to persons skilled in the art to which the disclosed subject matter pertains, are deemed to lie within the scope of the present invention.

LIST OF REFERENCE NUMERALS/LETTERS

1 Remotely operated vehicle assembly/robot
2 Storage bin
3 Storage system
4 Vehicle body/framework
6 Main power source/main battery
7 Cavity
8 Storage column
9 Vehicle lifting device
10 First set of vehicle rolling means/first set of wheels/driving means
11 Second set of vehicle rolling means/second set of wheels/driving means
13 Supporting rail
14 Vehicle support
15 Bin storing structure/bin storing grid
19 Circuit board/management system/battery management system
20 Charging station/first charging station
20' Adjacent charging station/second charging station
21 Auxiliary power source/auxiliary battery
22 Vehicle connection means/robot hook
23 Receiving means/robot aperture
24 Main battery cavity 25 Charge station connection means/charge station hook
26 Charge station aperture
50 Bin lift device
60 Delivery station/port
72 Top lid
73 Enclosing cover
74 Handles
75 Wireless communication means/control panel

The invention claimed is:

1. A remotely operated vehicle assembly for picking up storage bins from an underlying storage system, comprising:
   a vehicle body displaying a cavity for receiving a storage bin within the storage system,
   wherein the size of the cavity is adapted to contain components for a vehicle lifting device and to contain a largest storage bin intended to be picked up by the vehicle assembly,
   the vehicle lifting device at least indirectly connected to the vehicle body for vertically lifting the storage bin from the underlying storage system into the cavity,
   driving means connected to the vehicle body allowing remotely controlled movements of the vehicle assembly within the storage system,
   wireless communication means for providing wireless communication between the vehicle assembly and a remote control unit;
   a main power source supplying electrical power to the driving means; and
   vehicle coupling means for releasably coupling the main power source to the vehicle body,
   wherein said coupling means is configured to allow interchange of the main power source to a stationary charging station after receiving at least one communication signal from the control unit,
   wherein the vehicle assembly further comprises a management system that manages at least one of the power sources,
   said management system comprising:
      means for monitoring at least one selected from the group consisting of: voltage, temperature, state of charge (SOC), depth of discharge (DOD), state of health (SOH), coolant flow, and current; and
      recharging controlling means for controlling at least one parameter related to recharging of at least one of the power sources.

2. The vehicle assembly in accordance with claim 1, wherein at least one of the power sources is a capacitor.

3. The vehicle assembly in accordance with claim 1, wherein the vehicle coupling means further comprises at least one battery hook pivotably connected to the vehicle body that enables releasable connection between the main power source and the vehicle body.

4. The vehicle assembly in accordance with claim 1, wherein the main power source is arranged within a dedicated main battery cavity.

5. The vehicle assembly in accordance with claim 1, wherein the vehicle assembly further comprises an auxiliary power source that supplies electrical power to the driving means.

6. The vehicle assembly in accordance with claim 5, wherein, during the operation of the vehicle, a minimum amount of power stored in the auxiliary power source equals the power required to move the vehicle assembly from one charging station to an adjacent charging station.

7. The vehicle assembly in accordance with claim 5, wherein the auxiliary power source and the main power source are interconnected such that the main power source may charge the auxiliary power source when the main power source is operationally connected to the vehicle assembly.

8. The vehicle assembly in accordance with claim 1, wherein at least one of the power sources is a rechargeable battery.

9. The vehicle assembly in accordance with claim 8, wherein the vehicle assembly further comprises a battery management system (BMS) managing at least one of the power sources.

10. The vehicle assembly in accordance with claim 1, wherein the main power source comprises:
    a receiving means for enabling releasable connection to a corresponding charge station connection means situated on a charge station.

11. The vehicle assembly in accordance with claim 10, wherein at least one of the receiving means is a hook receiving means.

12. A storage system for storage of bins comprising:
    a remotely operated vehicle assembly in accordance with claim 1;
    a charging station;
    a vehicle support; and
    a bin storing structure supporting the vehicle support, the structure comprising a plurality of storage columns, wherein
    each storage column is arranged to accommodate a vertical stack of storage bins.

13. A method for charging a power source arranged in a remotely operated vehicle assembly, the method comprising:
    a) moving the remotely operated vehicle assembly to a charging position adjacent to a first charging station;
    b) transferring a first main power source connected to a vehicle body of the vehicle assembly to the first charging station;
    c) moving the vehicle assembly to a second charging station using an auxiliary power source that supplies auxiliary electrical power to driving means; and
    d) transferring a second main power source connected to the second charging station to the vehicle body, the second main power source having been charged for a time period (T) by the second charging station.

14. The method in accordance with claim 13, further comprising:
    lowering the vehicle body towards an underlying vehicle support during step b) and during step d), thereby disconnecting the main power source from the vehicle body; and
    raising the vehicle body away from the underlying vehicle support after step b) and after step d), thereby allowing connection of the main power source to the charging station,
    wherein said lowering and raising of the vehicle body is achieved by elongation means connected to, or being an integral part of, the driving means.

15. The method in accordance with claim 14, wherein the method steps are controlled by transmitting communication signals between a control unit and a wireless communication means within the vehicle assembly.

16. The method in accordance with claim 14, wherein the vehicle is in accordance with claim 1.

* * * * *